United States Patent [19]

Czech et al.

[11] Patent Number: 5,154,885
[45] Date of Patent: Oct. 13, 1992

[54] HIGHLY CORROSION AND/OR OXIDATION-RESISTANT PROTECTIVE COATING CONTAINING RHENIUM

[75] Inventors: Norbert Czech, Essen; Friedhelm Schmitz, Dinslaken, both of Fed. Rep. of Germany

[73] Assignee: Siemens Aktiengesellschft, Munich, Fed. Rep. of Germany

[21] Appl. No.: 566,154

[22] Filed: Aug. 10, 1990

[30] Foreign Application Priority Data

Aug. 10, 1989 [DE] Fed. Rep. of Germany ....... 3926479

[51] Int. Cl.$^5$ ...................... C22C 38/18; C22C 19/00
[52] U.S. Cl. ...................................... 420/588; 420/40; 420/436; 420/437; 420/438; 420/440; 420/443; 420/583; 420/585; 420/586; 420/584.1
[58] Field of Search ................ 420/40, 588, 583, 438, 420/437, 436, 439, 445, 440, 584, 443, 585, 586; 428/658, 656

[56] References Cited

U.S. PATENT DOCUMENTS

| | | | |
|---|---|---|---|
| 3,928,026 | 12/1975 | Heclet | 420/443 |
| 4,005,989 | 2/1977 | Grestou | 427/405 |
| 4,034,142 | 7/1977 | Heclet | 428/678 |
| 4,451,299 | 5/1984 | Smeggil et al. | 148/4 |
| 4,764,225 | 8/1988 | Shankar et al. | 148/404 |

FOREIGN PATENT DOCUMENTS

| | | |
|---|---|---|
| 2132022 | 1/1973 | Fed. Rep. of Germany ...... 420/588 |
| 2526683 | 1/1976 | Fed. Rep. of Germany . |
| 2355674 | 4/1976 | Fed. Rep. of Germany . |
| 1758010 | 12/1978 | Fed. Rep. of Germany . |
| 0194392 | 9/1986 | Fed. Rep. of Germany . |
| 2378869 | 9/1978 | France .............................. 420/443 |
| 2463192 | 2/1981 | France . |

*Primary Examiner*—Deborah Yee
*Attorney, Agent, or Firm*—Herbert L. Lerner; Laurence A. Greenberg

[57] ABSTRACT

A protective coating for metal components formed of nickel or cobalt-based superalloys essentially consists of the following constituents (in percentages by weight):
1 to 20% rhenium,
22 to 50% chromium,
0 to 15% aluminum, the share of chromium and aluminum taken together being at least 25% and at most 53%,
0.3 to 2% in total of at least one reactive element from the group consisting of the rare earths, and
0 to 3% silicon,
impurities, as well as the following elective components:
0 to 5% hafnium,
0 to 12% tungsten,
0 to 10% manganese,
0 to 15% tantalum,
0 to 5% titanium,
0 to 4% niobium, and
0 to 2% zirconium,
the total share of the elective components being from 0 to a maximum of 15%, and a remainder primarily being at least one of the elements iron, nickel, and cobalt.

28 Claims, No Drawings

HIGHLY CORROSION AND/OR OXIDATION-RESISTANT PROTECTIVE COATING CONTAINING RHENIUM

The invention relates to a protective coating for metal components, in particular gas turbine components made from nickel or cobalt-based superalloys.

Protective coatings for metal components which are intended to increase the corrosion resistance and/or oxidation resistance thereof have become known heretofore in great numbers in the prior art. Most of these coatings are known by the collective name MCrAlY, in which M stands for at least one of the elements iron, nickel, and cobalt, and other essential components are chromium, aluminum and yttrium, or an element equivalent to yttrium from the group of rare earths. Typical coatings of this type are known, for example, from U.S. Pat. No. 4,005,989.

From U.S. Pat. No. 4,034,142, it is also known that an additional constituent, silicon, can further improve the properties of such protective coatings. European Published Non-Prosecuted Patent Application 0 194 392 also discloses numerous special compositions for protective coatings of the foregoing type, with admixtures of further elements for various applications. The element rhenium in admixtures of up to 10% (by weight) is also mentioned, together with many other elective components. Because of the generally low chromium content of less than 12% in all of the layers disclosed in this document, and because of the otherwise relatively unspecified wide ranges of possible admixtures, however, none of the disclosed coatings is qualified for special conditions that occur, for example, in stationary gas turbines having a high inlet temperature, if these turbines are operated not only at full load but also at partial load over relatively long periods of time, or in related applications, for example, such as in aircraft engines.

Starting from this prior art, it is an object of the invention to provide a protective coating which has high corrosion resistance both at medium temperatures and at high temperatures. Corrosion and oxidation properties in the temperature range from 600° to 1150° C. should be improved so that such protective coatings can be used especially in stationary gas-turbine installations or systems having inlet temperatures of above 1200° C., for example, which operate in the partial-load or full-load range. It is also an object of the invention to provide such a protective coating which has increased corrosion resistance and oxidation resistance for other applications.

With the foregoing and other objects in view, there is provided, in accordance with the invention, a protective coating for metal components formed of nickel or cobalt-based superalloys which is made up of the following constituents (in percentages by weight): 1 to 20% rhenium, 22 to 50% chromium, 0 to 15% aluminum, the share of chromium and aluminum taken together being at least 25% and at most 53%, 0.3 to 2% in total of at least one reactive element from the group consisting of the rare earths, in particular yttrium, and 0 to 3% silicon, with the remainder being at least one of the elements iron, nickel and cobalt, and preferably only nickel and/or cobalt. The protective coating can naturally contain the usual impurities resulting from the smelting process and the admixtures typical for alloys of this type. It has also become known heretofore from the prior-art literature that certain elective components do not affect a protective coating or, in fact, actually improve the production of properties thereof from various aspects. The invention is also intended to include protective coatings having a total content or share of elective components of 15% maximum and, in particular, in a range of only a few percent. Typical elective components heretofore known from the literature for protective coatings, and their content shares, are: 0 to 5% hafnium, 0 to 12% tungsten, 0 to 10% manganese, 0 to 15% tantalum, 0 to 5% titanium, 0 to 4% niobium, and 0 to 2% zirconium.

The invention makes use of the fact that rhenium, as an admixture in protective coatings, can considerably improve the service life thereof under corrosive or oxidizing influences and, despite the low price thereof, it has an effect which is similar to the positive effects of platinum and other metals of the platinum group. The addition of rhenium can therefore further improve layers which are optimized for various purposes.

Ranges which are favorable for applications in stationary gas turbines, for example, are 1 to 15% rhenium, preferably 4 to 10%, and especially approximately 7%. For this application, an aluminum content of 7 to 9%, preferably approximately 8%, is suitable, with a view towards ductility. In order to attain good corrosion resistance at medium temperatures of up to approximately 900° C., a share of 28 to 32% chromium should be provided. A share of 1 to 2% silicon reinforces the action of chromium and aluminum and promotes the adhesion of a protective aluminum oxide layer which forms as a result of the aluminum presence. In the case of a nickel-based material or a superalloy having a high proportion of nickel, a content of 25 to 25% nickel improves the ductility and, simultaneously, reduces interdiffusion with respect to the basic material of the coated component. The remaining cobalt share effects good corrosion resistance properties at high temperatures, which are further improved by the rhenium share.

For stationary gas turbines having a high inlet temperature above 1200° C., for example, the following composition is therefore qualified: 1 to 15% rhenium, preferably 4 to 10%; 25 to 35% nickel, preferably approximately 30%; 28 to 32% chromium, preferably approximately 30%; 7 to 9% aluminum, preferably approximately 8%; 1 to 3% silicon, preferably approximately 1.5%; 0.3 to 2% yttrium, preferably approximately 0.6%; the remainder being cobalt, impurities resulting from the smelting process, and elective components such as given hereinbefore. A preferred field of use for these protective coatings is the upstream blades and components in the inlet region of a stationary gas turbine which has a high full-load inlet temperature and is intended for intermittent operation in the partial-load range, as well.

For other applications, such as aircraft engines, for example, a rhenium share can likewise increase the service life of the layers used for the protective coating. For this purpose, the following composition is a representative example: 1 to 15% rhenium, preferably 4 to 10%; 22 to 26% chromium; 9 to 15% aluminum, preferably approximately 10 to 13%; 0.3 to 2% of at least one reactive element from the group of rare earths, in particular yttrium; 0 to 30% cobalt, preferably 0 to 15%; 0 to 3% silicon, preferably 1 to 2%; the remainder being primarily nickel, as well as impurities and elective components as presented hereinabove. In layers which are formed particularly for protection against corrosion at approximately 600° to 850° C. (so-called HTC II), as well, an admixture of rhenium according to the invention has advantages, for example, in the following composition: 1 to 15% rhenium, preferably 4 to 10%; 25 to 50% chromium, preferably 35 to 45%; 0 to 3% aluminum, preferably 0 to 1%; 0.3 to 2% yttrium, preferably 0.6%; 0.3 to 3% silicon, preferably 1 to 2%; the remainder being primarily at least one of the elements of the group consisting of iron, cobalt and nickel, as well as impurities and elective components, as itemized hereinbefore.

The invention is not restricted to the examples given, but instead generally encompasses the improvement of specified layers for protecting against corrosion and oxidation under various conditions by the addition of smaller or larger content shares of rhenium.

The foregoing is a description corresponding in substance to German Application P 39 26 473.3, dated Aug. 10, 1989, the International priority of which is being claimed for the instant application, and which is hereby made part of this application. Any material discrepancies between the foregoing specification and the aforementioned corresponding German application are to be resolved in favor of the latter.

We claim:

1. A protective coating for metal components essentially consisting of the following constituents (in percentages by weight):
   1 to 20% rhenium,
   22 to 50% chromium,
   0 to 15% aluminum, the share of chromium and aluminum taken together being at least 25% and at most 53%,
   0.3 to 2% in total of at least one reactive element from the group consisting of the rare earths, and
   0 to 3% silicon,
   impurities, as well as the following elective components:
   0 to 5% hafnium,
   0 to 12% tungsten,
   0 to 10% manganese,
   0 to 15% tantalum,
   0 to 5% titanium,
   0 to 4% niobium, and
   0 to 2% zirconium,
   the total share of the elective components being from 0 to a maximum of 15%, and a remainder primarily being at least one of the elements iron, nickel, and cobalt.

2. The protective coating according to claim 1, wherein the rhenium share is 1 to 15%.

3. The protective coating according to claim 2, wherein the rhenium share is 4 to 10%.

4. The protective coating according to claim 3, wherein the rhenium share is approximately 7%.

5. The protective coating according to claim 1, wherein the aluminum share is from 7 to 9%.

6. The protective coating according to claim 1, wherein the silicon share is 1 to 2%.

7. The protective coating according to claim 1, wherein the chromium share is 28 to 32%.

8. The protective coating according to claim 1, wherein the nickel share is 25 to 35%.

9. The protective coating according to claim 1, wherein the cobalt share is 25 to 35%.

10. A protective coating for metal components, essentially consisting of the following constituents (in percentage by weight): 1 to 15% rhenium, 25 to 35% nickel, 28 to 32% chromium, 7 to 9% aluminum, 1 to 3% silicon, 0.3 to 2% yttrium, impurities, as well as the following elective components: 0 to 5% hafnium, 0 to 12% tungsten, 0 to 10% manganese, 0 to 15% tantalum, 0 to 5% titanium, 0 to 4% niobium, and 0 to 2% zirconium, the total share of the elective components being from 0 to a maximum of 15%, and a remainder being primarily cobalt.

11. The protective coating according to claim 10, wherein the rhenium share is from 4 to 10%.

12. The protective coating according to claim 10, wherein the nickel share is approximately 30%.

13. The protective coating according to claim 10, wherein the chromium share is approximately 30%.

14. The protective coating according to claim 10, wherein the aluminum share is approximately 8%.

15. The protective coating according to claim 10, wherein the silicon share is approximately 1.5%.

16. The protective coating according to claim 10, wherein the yttrium share is approximately 0.6%.

17. A protective coating for metal components, essentially consisting of the following constituents (in percentage by weight): 1 to 15% rhenium, 22 to 26% chromium, 9 to 15% aluminum, 0.3 to 2% of at least one reactive element selected from the group consisting of rare earth elements, 0 to 30% cobalt, 0 to 3% silicon, impurities, as well as the following elective components: 0 to 5% hafnium, 0 to 12% tungsten, 0 to 10% manganese, 0 to 15% tantalum, 0 to 5% titanium, 0 to 4% niobium, and 0 to 2% zirconium, the total share of the elective components being from 0 to a maximum of 15%, and a remainder being primarily nickel.

18. The protective coating according to claim 17, wherein the rhenium share is from 4 to 10%.

19. The protective coating according to claim 17, wherein the aluminum share is from approximately 10% to approximately 13%.

20. The protective coating according to claim 17, wherein the one reactive element selected from the group consisting of rare earth elements is yttrium.

21. The protective coating according to claim 17, wherein the cobalt share is from 0 to 15%.

22. The protective coating according to claim 17, wherein the silicon share is from 1 to 2%.

23. A protective coating for metal components, essentially consisting of the following constituents (in percentage by weight): 1 to 15% rhenium, 25 to 50% chromium, 0 to 3% aluminum, 0.3 to 2% yttrium, 0.3 to 3% silicon, impurities, as well as the following elective components: 0 to 5% hafnium, 0 to 12% tungsten, 0 to 10% manganese, 0 to 15% tantalum, 0 to 5% titanium, 0 to 4% niobium and 0 to 2% zirconium, the total share of the elective components being from 0 to a maximum of 15%, and a remainder primarily being at least one of the elements of the group consisting of iron, nickel and cobalt.

24. The protective coating according to claim 23, wherein the rhenium share is from 4 to 10%.

25. The protective coating according to claim 23, wherein the chromium share is from 35 to 45%.

26. The protective coating according to claim 23, wherein the aluminum share is from 0 to 1%.

27. The protective coating according to claim 23, wherein the yttrium share is approximately 0.6%.

28. The protective coating according to claim 23, wherein the silicon share is from 1 to 2%.

* * * * *